(12) United States Patent
Scherzinger et al.

(10) Patent No.: US 8,395,542 B2
(45) Date of Patent: Mar. 12, 2013

(54) SYSTEMS AND METHODS FOR COMPUTING VERTICAL POSITION

(75) Inventors: Bruno Scherzinger, Richmond Hill (CA); Ulrich Vollath, Ismaning (DE)

(73) Assignee: Trimble Navigation Limited, Sunnyvale, CA (US)

( * ) Notice: Subject to any disclaimer, the term of this patent is extended or adjusted under 35 U.S.C. 154(b) by 236 days.

(21) Appl. No.: 12/807,125

(22) Filed: Aug. 27, 2010

(65) Prior Publication Data
US 2012/0050095 A1   Mar. 1, 2012

(51) Int. Cl.
*G01S 19/47* (2010.01)
*G01S 19/40* (2010.01)

(52) U.S. Cl. .................. 342/357.3; 342/357.23

(58) Field of Classification Search .......... 342/357.23, 342/357.25, 357.3, 357.44, 357.46; 701/469, 701/470
See application file for complete search history.

(56) References Cited

U.S. PATENT DOCUMENTS

| | | |
|---|---|---|
| 4,065,856 A | 1/1978 | Waters |
| 5,347,286 A | 9/1994 | Babitch |
| 5,402,450 A | 3/1995 | Lennen |
| 5,493,588 A | 2/1996 | Lennen |
| 5,510,889 A | 4/1996 | Herr |
| 5,537,121 A | 7/1996 | Lennen |
| 5,549,412 A | 8/1996 | Malone |
| 5,563,917 A | 10/1996 | Sheynblat |
| 5,630,208 A | 5/1997 | Enge et al. |
| 5,699,255 A | 12/1997 | Ellis et al. |
| 5,771,456 A | 6/1998 | Pon |
| 5,790,243 A | 8/1998 | Herr |
| 5,790,843 A | 8/1998 | Borkenhagen et al. |
| 5,815,539 A | 9/1998 | Lennen |
| 5,828,694 A | 10/1998 | Schipper |
| 5,854,815 A | 12/1998 | Lennen |
| 5,903,597 A | 5/1999 | Pon |
| 5,907,578 A | 5/1999 | Pon et al. |
| 5,912,888 A | 6/1999 | Walsh et al. |
| 5,917,866 A | 6/1999 | Pon |
| 5,923,703 A | 7/1999 | Pon et al. |
| 5,928,309 A | 7/1999 | Korver et al. |
| 5,949,815 A | 9/1999 | Pon |
| 5,963,601 A | 10/1999 | Pon et al. |
| 5,966,403 A | 10/1999 | Pon |
| 6,002,361 A | 12/1999 | Schipper |

(Continued)

FOREIGN PATENT DOCUMENTS

| | | |
|---|---|---|
| EP | 0510215 | 10/1992 |
| EP | 0542297 | 5/1993 |

(Continued)

OTHER PUBLICATIONS

U.S. Appl. No. 12/277,840, filed Nov. 25, 2008, Taylor.

*Primary Examiner* — Dao Phan
(74) *Attorney, Agent, or Firm* — William E. Pelton, Esq.; Cooper & Dunham LLP (57) ABSTRACT

Control systems and methods that provide a high degree of vertical measurement accuracy for a body in motion are disclosed. The systems employ an inertial sensor system for vertical measurement and a Global Navigation Satellite System that includes multipath reduction or attenuation to provide corrected vertical information for a moving body to the inertial sensor system. The combination of these systems enables the maintenance of an accurate vertical position for said body.

14 Claims, 5 Drawing Sheets

U.S. PATENT DOCUMENTS

| | | | |
|---|---|---|---|
| 6,031,882 A | 2/2000 | Enge et al. | |
| 6,031,884 A | 2/2000 | Pon | |
| 6,055,477 A | 4/2000 | McBurney et al. | |
| 6,084,927 A | 7/2000 | Pon | |
| 6,128,337 A | 10/2000 | Schipper et al. | |
| 6,130,908 A | 10/2000 | Pon | |
| 6,154,173 A | 11/2000 | Lennen et al. | |
| 6,252,546 B1 | 6/2001 | Lennen et al. | |
| 6,252,863 B1 | 6/2001 | Raby et al. | |
| 6,414,987 B1 | 7/2002 | Pon | |
| 6,421,000 B1 | 7/2002 | McDowell | |
| 6,556,615 B1 | 4/2003 | Pon | |
| 6,633,256 B2 | 10/2003 | Zhdanov et al. | |
| 6,727,846 B1 | 4/2004 | Brown | |
| 6,799,922 B2 | 10/2004 | Smith | |
| 7,962,285 B2 * | 6/2011 | Breed | 701/472 |
| 2004/0066335 A1 | 4/2004 | Ashjaee | |
| 2009/0093959 A1 | 4/2009 | Scherzinger et al. | |
| 2010/0129152 A1 | 5/2010 | Taylor | |

FOREIGN PATENT DOCUMENTS

| | | |
|---|---|---|
| EP | 1088134 | 12/1999 |

* cited by examiner

SYSTEMS AND METHODS FOR COMPUTING VERTICAL POSITION

BACKGROUND

1. Field of the Disclosure

The present disclosure concerns apparatus and methods to accurately compute vertical position.

2. Background of the Disclosure

Modern construction and agricultural tasks often require a high degree of vertical accuracy. In fact, contracts for such projects, such as building a new highway or airport runway often have bonus fee schedules based on the extent to which the finished roadway is smooth and flat. Further, many projects include strict timetables that may also incorporate incentives for on time or early completion, and/or penalties for delays. Hence, it has become very important for contractors to complete construction projects such as roadways or runways, for example, quickly and with a high degree of vertical accuracy, often 1 centimeter, 2-sigma accuracy.

Heavy equipment such as pavers have traditionally used a variety of techniques to create smooth, flat surfaces with a high degree of precision. One low tech method commonly employed to construct smooth, flat roadways is to position hubs at periodic intervals along either side of the road site. Pins are then inserted into the hubs, and a stringline is tied to the pins and pulled taught at the appropriate height for the roadway under construction. The paver's operator then manually attempts to follow the stringline so the resulting asphalt layer is deposited at the appropriate place and depth.

Pavers consist of two main components, the tractor and the screed. The tractor receives, mixes and spreads the asphalt onto the surface to be paved, while propelling the paver forward. The screed compacts and smoothes the deposited asphalt to the desired width and thickness. Therefore, accurately controlling the vertical position of the screed is critical to achieving a smooth, level roadway.

Pavers employ two sensing wands for control purposes: one wand to control elevation; the other to control left/right positioning. The elevation-sensing wand skims the underside of the stringline (or guideline) and is used to control the elevation of the paver's screed (that portion of the paver that compacts and smoothes the asphalt). The alignment-sensing wand skims along the inside of the stringline and is used to control the left/right position of the paver.

However, stringline systems have numerous drawbacks. For example, setting up and taking down a stringline is very time consuming, usually requiring a separate crew. Further, setting up and taking down stringlines is expensive (estimated costs for stringlines range from $10,000 to $16,000 per mile). More importantly, stringlines, particularly those fabricated from polyethylene rope, are prone to sag. To combat sag, aircraft cable has been employed in place of polyethylene rope, however, stretching aircraft cable to avoid sag requires a winch, which in turn consumes additional time and equipment to set up.

In the past several years, two alternatives to the use of stringlines have emerged: Global Navigation Satellite Systems ("GNSS") and Universal Total Stations. For this application, GNSS refers to any satellite navigation system, including but not limited to GPS, GLONASS, GALILEO and COMPASS.

GNSS employs an antenna and receiver mounted on the paver to control the elevation and left/right position of the machine. In addition, a second receiver can be employed as a base station to provide Real Time Kinematic ("RTK") or a carrier phase enhanced GNSS, with its attendant higher accuracy. RTK or carrier phase enhanced GNSS are well known in the art of global satellite navigation systems.

However, there are several drawbacks to using GNSS for this application. For example, GNSS systems are substantially less accurate for measuring vertical position compared to horizontal position, based on (among other things) the position of the GNSS satellites in view at a given time, the unevenness of the earth's surface compared to the ellipsoid approximation of the earth's surface (employed by most GNSS receivers), along with propagation delays and multipath errors introduced by the earth's atmosphere. Finally, GNSS systems suffer from latency issues, for example, latency in the reference receiver data due to telemetry delay. Hence, GNSS systems alone may not be sufficient for activities that require a great degree of vertical accuracy, in other words, applications that require vertical accuracy of one centimeter or less.

Another alternative to the use of stringlines is a Universal (or Robotic) Total Station (hereafter "UTS"), which uses a combination of laser and radio telemetry technologies to track a moving prism. For example, UTS systems usually employ a pair of prisms mounted on the left and right side of a paver's screed. Two total stations are positioned along each side of the roadway, each consisting of a tripod-mounted laser and a radio modem. The laser beam of each total station is set at a desired elevation and is detected and reflected by the prisms mounted on the either end of the screed. A change in elevation of the screed's prisms as the screed moves relative to the known elevation of the laser beam is then detected. Onboard signal processing applications assist the operator to follow the location and elevation of the two laser beams as detected by the prisms mounted on the screed.

UTS systems have known drawbacks. For example, UTS systems must be constantly moved, re-installed and re-leveled approximately every 100 meters or 200 meters as the paver moves forward. Even though two sets of UTSs can be leapfrogged (i.e., one system is in use while another is moved up the roadway and set up), this leapfrogging requires additional equipment and manpower. Further, UTS systems are susceptible to environmental interference such as rain, snow, dust and wind.

Therefore, there is a need for an improved control system for construction, agricultural and other heavy equipment that is capable of 1 centimeter vertical accuracy, that does not require stringlines, and avoids the above-mentioned drawbacks of GNSS and UTS systems.

BRIEF SUMMARY OF THE INVENTION

The concept of this disclosure includes a system for determining the vertical position of a body in motion using: an inertial measurement unit configured to determine vertical acceleration information for the body in motion; a processor adapted to use the vertical acceleration information to determine an amount of vertical movement of the body and to calculate vertical position information for the body in a predetermined coordinate system; and a GNSS having at least one GNSS receiver adapted to provide reference vertical position information for the body in the predetermined coordinate system, where the GNSS receiver is configured to reduce multipath noise and to output corrected GNSS vertical position information for the body to the processor, which determines by comparison inertial measurement errors of the inertial measurement unit and calculates a correct vertical position of the body in motion.

Other methods of reducing multipath noise may be employed rather than a GNSS receiver configured to reduce multipath noise. For example, a Kalman filter, a Morrison filter, and/or a Hatch filter can be employed to filter out the mulitpath noise. Similarly, equalization techniques and/or moving phased array antennas can be used to reduce, minimize or eliminate multipath noise.

Also disclosed is a method for determining the vertical position of a body in motion comprised of the steps of: determining vertical acceleration information of a body in motion; calculating, from the vertical acceleration information of said body in motion, the amount of vertical movement and vertical position of said body in motion; and determining a vertical reference position from at least one GNSS receiver configured to attenuate multipath distortions and correct for multipath errors in determining said reference vertical position information.

Another system is disclosed for determining vertical position comprising: an inertial measurement unit that includes a navigation-grade accelerometer for determining the vertical acceleration information of a body in motion; a processor for determining vertical position information from the vertical acceleration information; at least one global navigation satellite system receiver adapted to provide reference vertical position information of the body in motion; and a controller configured to reduce multipath satellite signals from the global navigation satellite system receiver, the output of the controller providing vertical position correction information to the processor for determining vertical position.

Another system is disclosed for determining vertical position comprising: an inertial measurement unit for determining vertical acceleration information of a body in motion; a processor for determining vertical position information from the vertical acceleration information; at least one global navigation satellite system receiver adapted to provide reference vertical position information of the body in motion, where the receiver includes one or more antennas configured to randomize multipath signals to noise; and a vertical position error controller, the input to the controller being the reference vertical position information and the determined vertical position information, and the output of the controller providing vertical position correction information to the processor for determining vertical position.

Another method for determining vertical position is disclosed comprising the steps of: providing navigation-grade vertical acceleration information of a body in motion; providing satellite-based vertical position information of the body in motion; processing the vertical acceleration information of the body in motion to determine vertical position information; determining the difference between the determined vertical position information and the provided vertical position information; and employing that difference in processing the vertical acceleration information of the body in motion.

A further system for determining vertical position is disclosed comprising: a navigation-grade accelerometer for determining vertical acceleration information of a body in motion; a processor for determining vertical position information from the vertical acceleration information; a satellite navigation receiver for providing reference vertical position information of the body in motion, where the receiver includes an antenna connected to the satellite navigation receiver configured to randomize multi-path noise; and a negative feedback loop, including a filter, whose input is the difference between the reference vertical position information and the determined vertical position information, and whose output is said processor for determining vertical position information.

An additional method for determining vertical position plus or minus 1 centimeter, 2-sigma is disclosed, comprising the steps of: determining a vertical reference position using a satellite navigation receiver; performing a first integration of the output of a navigation-grade accelerometer with respect to time; using the output of the first integration as the input to a second integration with respect to time to obtain inertial vertical position; delaying the inertial navigation position to account for the latency associated with said global navigation system receiver; subtracting the delayed inertial position from the vertical reference position; and feeding back the difference, using negative feedback, to the acceleration and velocity integrators so as to reduce the errors introduced in the acceleration and velocity integrators from the accelerometer.

BRIEF DESCRIPTION OF THE DRAWINGS

The features of the present disclosure can be more readily understood from the following detailed description with reference to the accompanying drawings wherein.

DETAILED DESCRIPTION OF THE PREFERRED EMBODIMENTS

In an embodiment, an inertial navigation system is combined with a Global Navigation Satellite System ("GNSS") to obtain a vertical position for construction equipment, such as a paver for example. This combination utilizes the attributes of GNSS and inertial navigation systems and mitigates the inherent limitations of each system when used alone. For example, an inertial navigation system may include navigation-grade accelerometers. Such a system is capable of providing near zero latency and very low short-term noise; while a GNSS offers long-term error stability. It will be understood by a person of ordinary skill in the art that a navigation-grade inertial system contains gyroscopes and accelerometers that are sufficiently accurate to provide less than 1.5 km drift per hour. However, while navigation grade inertial systems are useful, such a system is not a required element of each embodiment described in the present disclosure. Nevertheless, it has been found advantageous to combine a navigation grade inertial system with a GNSS system that includes multipath amelioration. Such a hybrid system may provide 1 centimeter, 2 sigma vertical position accuracy required by today's modern heavy equipment and exacting project specifications.

In GNSS, multipath refers to satellite signals that arrive at a GNSS receiver's antenna along two or more paths of unequal length. Multipath signals can be caused by atmospheric effects, refraction and/or reflection from nearby bodies of water, and terrestrial objects such as mountains, buildings and other structures. Multipath interference can result in a substantial loss of accuracy, for example, causing the computed receiver position to appear to creep or move suddenly, yielding unreliable position accuracy. Hence, reducing or eliminating multipath signals is and has been a goal for GNSS receivers for some time.

Over the years, many different methods have been devised to mitigate or eliminate the effects of multipath in a GNSS. See for example, U.S. Pat. No. 5,563,917, entitled "Compensation for Multipath Errors and Ionosphere Delays in Differential Satellite Positioning Systems"; U.S. Pat. No. 5,771,456, entitled "Enhanced Suppression of Multipath Interference"; U.S. Pat. No. 5,630,208, entitled "Adaptive Multipath Equalization"; U.S. Pat. No. 6,252,546, entitled "Method and Apparatus for Processing Multipath Reflection Effects in Timing Systems"; U.S. Pat. No. 6,252,863, entitled, "Multipath Compensation for Pseudorange Signals"; and U.S. Patent Pub. No. 2004/0066335, entitled "Moving Antenna Phase Array Systems Related to Multipath Signals in Global Positioning Applications, and Methods of Using"; which are incorporated herein by reference in their entirety.

Heretofore, several varieties of low pass filters have been devised to eliminate or reduce multipath effects, including but not limited to use of a Kalman filter, a Morrison filter, and/or a Hatch filter. Other recursive or predict-and-update filters can be used to reduce or eliminate the effects of multipath, including but not limited to INS integration. For the purposes of this disclosure, any method of multipath reduction or amelioration known to a person of ordinary skill in the art will suffice. This disclosure addresses the reduction in the effects of multipath available via the combination of GNSS position information and inertial position information.

The combination of a GNSS receiver that employs multipath reduction with a navigation grade IMU is particularly synergistic because of the nature of the noise and errors present in both types of systems. For example, the multipath error in the GNSS receiver's vertical position solution generally has a power spectrum with a lower frequency bound due to rover antenna movement and multipath suppression at the reference antenna. In contrast, for a navigation grade accelerometer, the vertical position error computed by twice integrating the sensed vertical acceleration will exhibit a quadratic-with-time position growth whose power spectrum has a near zero frequency bandwidth.

Provided these two power spectra are largely non-overlapping, a properly designed complementary filter will combine the two data sources to yield an integrated solution in which both vertical position errors are attenuated and the vertical position accuracy specification is met. The preferred embodiment uses a Kalman filter to regulate all inertial navigation errors, one of which is the vertical position error, using the GNSS position solution. The Kalman filter performs the complementary filtering of the inertial and GNSS vertical position solutions in order to achieve the specified accuracy.

Use of an expensive navigation-grade inertial measurement unit that contains highly accurate gyros and accelerometers in the x, y and z axes is unnecessary from a technological and cost standpoint. Although use of such a device would achieve good accuracy in all axes, it would be redundant since only the vertical axis is of interest. By using only one highly accurate accelerometer positioned in the vertical direction and lower cost inertial sensors for the x and y axes, the required vertical accuracy is achieved at a reasonable cost. The embodiments described herein are examples of different ways to build such a system.

Figure 1:
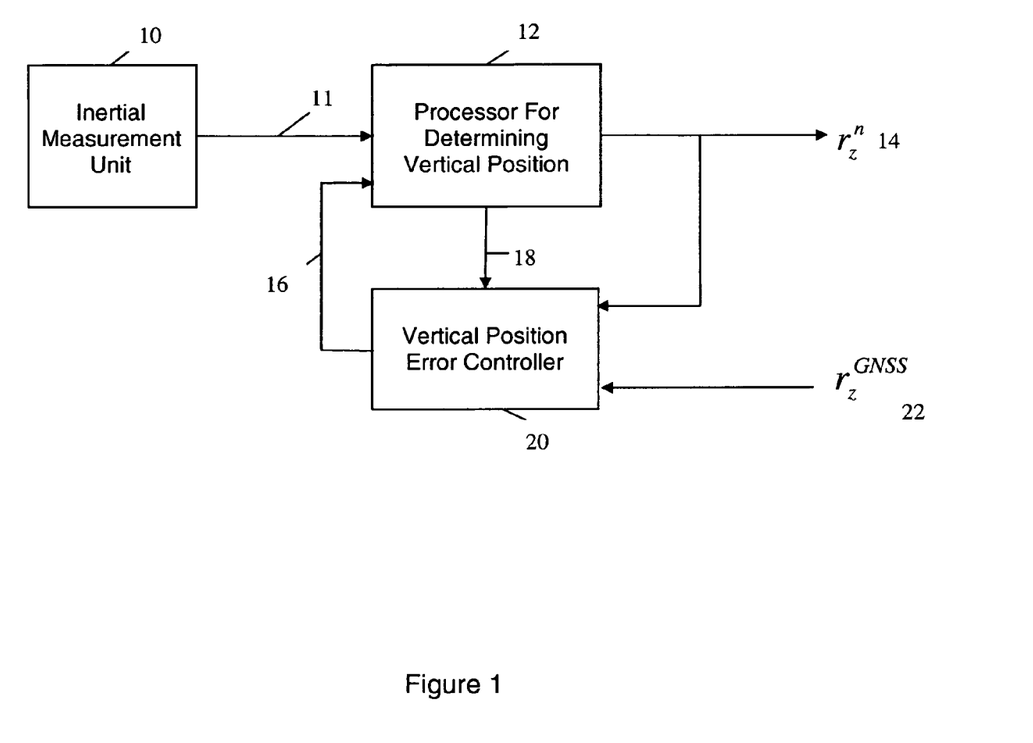
FIG. 1 shows a block diagram of a generalized vertical positioning system.

A generalized block diagram of one embodiment of the present disclosure is shown in FIG. 1. Block 10 contains an inertial measurement unit, which generally includes three gyroscopes, two medium accuracy accelerometers and may include a high accuracy accelerometer for measuring acceleration in the vertical direction. The output of the high accuracy accelerometer is then processed by a computing system 12, which computes vertical position information, $r_z^n$ 14 using, inter alia, two integrators. The double integration of acceleration is vertical distance traveled, or height when relative to a known reference position. This computed vertical position information, $r_z^n$ 14, along with reference vertical position information from one or more GNSS receivers, $r_z^{GNSS}$ 22, is then provided to a vertical position error controller 20. Additional hardware and/or software can be employed to implement an enhanced GNSS. For example, a second GNSS receiver can be employed to implement an RTK (or carrier-phase enhanced GNSS), or a differential GNSS can be employed. Vertical position error controller 20 may include a fixed-gain, vertical position controller, and/or some other type of estimator and error controller such as a Kalman filter, for example. In turn, negative feedback loop 16 provides error correction to the processor 12.

Figure 2:
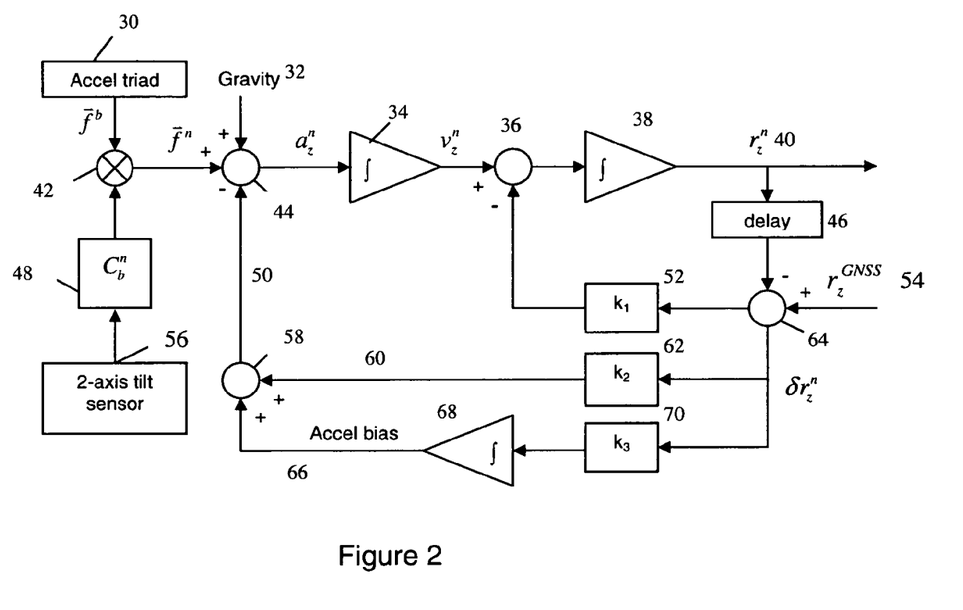
FIG. 2 shows a block diagram of a vertical positioning system employing fixed gain and a negative feedback loop.

With reference to FIG. 2 there is shown an embodiment having a fixed gain, vertical position filter to determine vertical position with an accuracy of plus or minus 1 centimeter, 2-sigma. Specifically, the vertical position filter shown in FIG. 2 is a third order vertical filter similar to those found in barometric altitude-slaved inertial navigation systems. However, instead of using barometric pressure as the reference altitude, the reference altitude is the vertical component of the GNSS solution.

The accelerometer triad 30 comprises three accelerometers arranged orthogonally to each other. The vertical accelerometer may be a navigation-grade servo-accelerometer (such as the Honeywell QA2000). The two horizontal accelerometers may be of a lower-grade, possibly micro-electro-mechanical ("MEMS") accelerometers. The accelerometer triad measures a specific force vector $\bar{f}^b$ in a sensor body coordinate frame (b-frame) that is approximately aligned with the along-track (distance), cross-track (course width) and vertical directions of the screed or other equipment.

A 2-axis tilt sensor 56 measures the pitch and roll of the x and y axes of the accelerometer triad 10 with respect to a navigation frame (n-frame) that is locally level and has the same azimuth as the b-frame. Locally level is defined to mean the navigation frame x and y axes, which are orthogonal to the local gravity vector.

The output of the 2-axis tilt sensor 56 is used to compute the direction cosine matrix ("DCM") $C_b^n$ 48 that transforms $\bar{f}^b$ to $\bar{f}^n = C_b^n \bar{f}^b$ using multiplier 42. The resulting z-component of $\bar{f}^n$, is thereby corrected for gravity 32 via summer 44 to yield the vertical acceleration, $a_z^n$. The vertical acceleration, $a_z^n$, is first integrated with respect to time using integrator 34 to determine vertical velocity $v_z^n$, and then corrected (using negative feedback) by adder 36. That corrected sum from adder 36 is then integrated with respect to time again, using integrator 38, to determine a vertical distance position or height $r_z^n$ 40.

The filter shown in FIG. 2 then computes the difference $\delta r_z^n = r_z^n - r_z^{GNSS}$ between the computed height $r_z^n$ (which is the double integration of the vertical acceleration value, $a_z^n$), and the GNSS vertical height or position $r_z^{GNSS}$ using adder 64. The true vertical positions cancel in the subtraction, leaving the position errors, $\delta r_z^n$. Just as in the other figures and embodiments described herein, GNSS vertical position might be sourced from a single GNSS receiver and antenna or multiple receivers and antennas in an RTK or carrier-phase system.

Adder 64 then feeds this difference $\delta r_z^n$ back through constant gain $k_1$ via loop 52 to correct the computed velocity. The difference $\delta r_z^n$ is also multiplied by constant gain $k_3$ and integrator 68 to determine acceleration bias 66. In other words, the integrator 68 accumulates the vertical acceleration bias, which includes the accelerometer bias and the gravity correction error. A third feedback loop 60 is provided by difference $\delta r_z^n$ multiplied by constant $k_2$. The sum of the acceleration bias on feedback loop 66 and $k_2 \cdot \delta r_z^n$ on feedback loop 60 is combined by adder 58 and then subtracted from the vertical acceleration $a_z^n$ at adder 44.

The gains represented by constants $k_1$, $k_2$ and $k_3$ are designed to achieve a tradeoff between short-term position accuracy provided by the double integrated acceleration, and the longer term reference accuracy provided by the GNSS. There are several approaches to determining constants $k_1$, $k_2$ and $k_3$. For example, one approach is to design the vertical position filter as a Wiener filter and thereby obtain $k_1$, $k_2$ and $k_3$ as part of the Wiener filter implementation.

The fixed gain vertical filter shown in FIG. 2 compensates for the latency of the GNSS position fixes simply by interposing fixed delay 46 between the output of the double integration, $r_z^n$, and adder 64. This introduces a loop delay which requires that the values assigned to constants $k_1$, $k_2$ and $k_3$ be adjusted to maintain loop stability. The less accurate low-latency solution is not required. The reason this filter can tolerate a loop delay is that the error dynamics are low frequency.

The gains $k_1$, $k_2$ and $k_3$ can be designed for an assumed maximum delay. Alternatively, an array of gains can be designed for a discrete number of delay intervals. The filter then uses the set of gains corresponding to the interval in which the actual delay falls.

The 2-axis tilt sensor 56 should measure the full tilt dynamic range with good accuracy. For example, if the screed moves at a constant speed and undergoes slow attitude changes, then a tilt sensor including a pair of accelerometers (or its equivalent) will suffice. However, a smaller screed may experience higher dynamics such as jolts and rocking. In this case, a tilt sensor that has the required dynamic bandwidth may include gyros and accelerometers and a complementary filter or fully aided Inertial Navigation System ("AINS") mechanization. For example, a Position and Orientation System ("POS") that uses a Micro-Electrical-Mechanical Inertial Measurement Unit ("MEMS IMU") will provide 0.1 degree pitch and roll accuracy over a large dynamic range, which is sufficient for this application.

Figure 3:
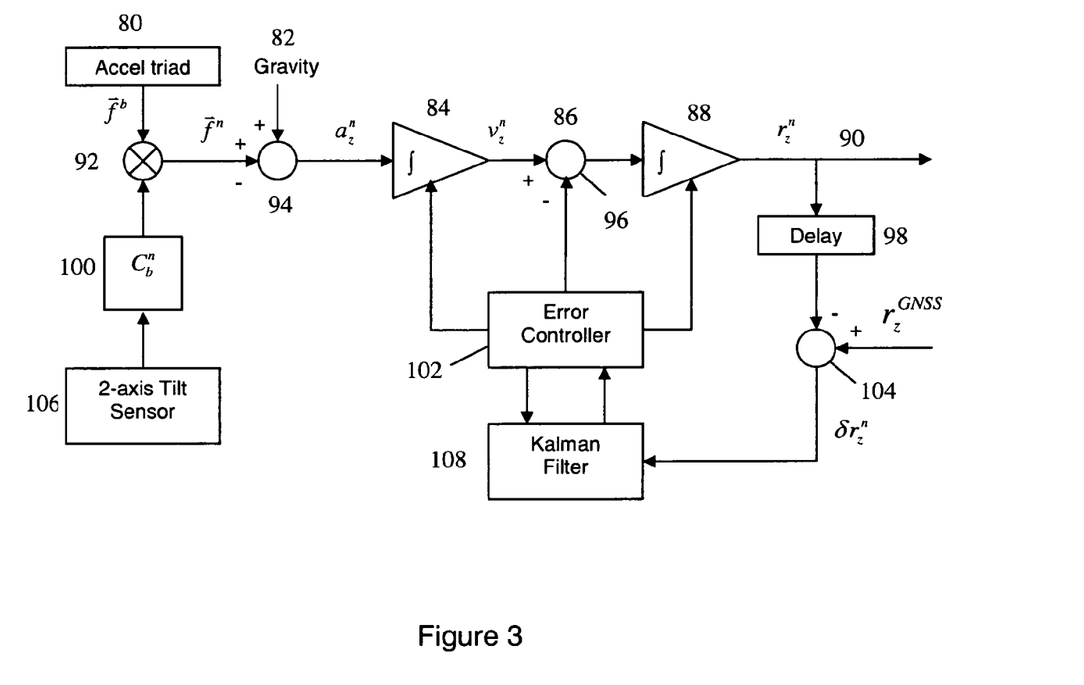
FIG. 3 shows a block diagram of a vertical positioning system that includes a Kalman error estimator.

Referring now to an embodiment shown in FIG. 3, the design is similar to the fixed-gain filter shown in FIG. 2, but differs in the method of vertical position error estimation and control. Kalman filter 108 shown in FIG. 3 implements a vertical channel error model such as the following (continuous-time version shown below):

$\delta \dot{r}_z^n = \delta v_z^n$
$\delta \dot{v}_z^n = \delta a_z^n + \eta_\alpha$
$\delta \dot{a}_z^n = \beta \delta a_z^n + \eta_{\delta\alpha}$ This models acceleration error as a $1^{st}$-order Markov process plus random noise. The Kalman filter state vector is given by—

$$\vec{x} = \begin{bmatrix} \delta r_z \\ \delta v_z \\ \delta a_z \end{bmatrix}$$

The Kalman filter constructs the following measurement—
$z_r = \delta r_z^n = r_z^n - r_z^{GNSS}$
which directly observes the vertical position error $\delta r_z$ and allows Kalman filter 80 to estimate the complete state vector.

Error controller 102 transfers the estimates of the velocity error $\delta \hat{v}_z$ and position error $\delta \hat{r}_z$ to the respective acceleration 84 and velocity 88 integrators and corrects the Kalman filter state as $\vec{\hat{x}}^+ = \vec{\hat{x}}^- - \vec{\hat{x}}_{corr}$ to account for the integrator correction.

The device shown in FIG. 3 implements the inertial integration at the acceleration data rate, typically 200-1000 Hz, and the Kalman filter at the GNSS position data rate, typically 1-10 Hz. This configuration also allows delay 98 to be inserted into the error control loop to handle latent synchronized data from the GNSS receiver. Error controller 102 is programmed to scale the integrator resets to maintain the stability of the error regulation loop.

Figure 4:
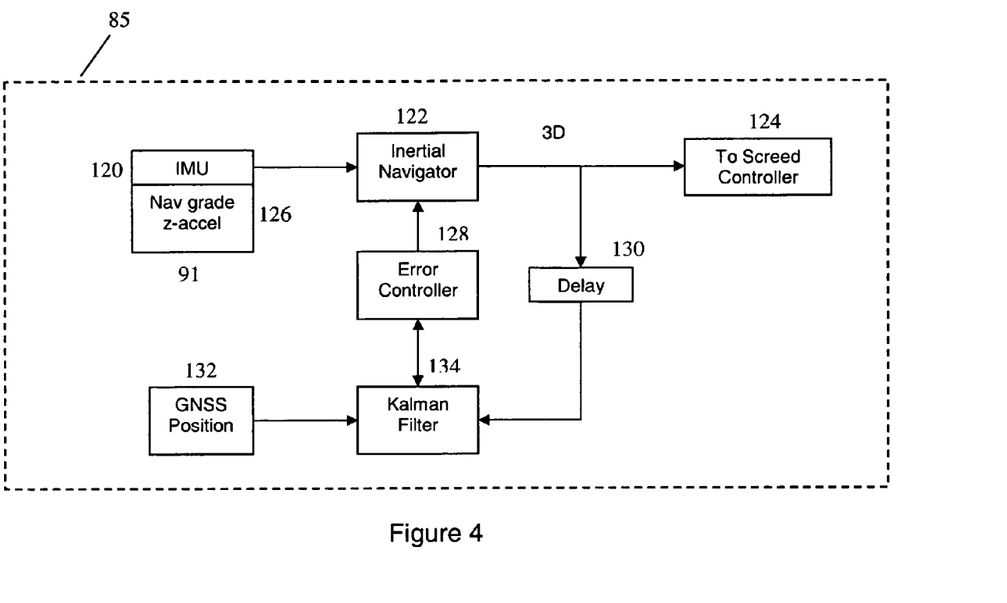
FIG. 4 shows a block diagram of a vertical positioning system showing an alternate embodiment.

FIG. 4 shows an Applanix Position and Orientation System ("POS") 91 whose Inertial Measurement Unit ("IMU") 120 is configured to contain a navigation-grade accelerometer 126 in the z-axis. Alternatively the vertical accelerometer is implemented separately from a low cost IMU and its data substitutes for the IMU z-axis accelerometer data.

The aided Inertial Navigation System ("AINS") shown in FIG. 4 is well-known in the navigation community. The Inertial Navigator 122 implements Newton's translational and rotational equations of motion on the approximately spherical earth using measured accelerations from Inertial Measurement Unit ("IMU's") 120 accelerometers and angle changes from the IMU gyros. Kalman filter 134 is designed to estimate the INS position, velocity and orientation errors and the IMU and GNSS errors. Error controller 128 translates the estimated INS errors into corrections to Inertial Navigator 122 and Kalman filter 134. The closed loop around the inertial navigator thus regulates the INS errors to a level of accuracy that is consistent with the GNSS position accuracy. The configuration shown in FIG. 4 includes delay 130 in the INS position to Kalman filter 134 to compensate for GNSS latency. Error controller 128 includes a loop gain attenuation that keeps the error regulation loop stable. More specifically, error controller 128 computes one or more reset vectors, based on information provided by the Kalman filter 108, and applies the one or more reset vectors to integrators 84 and 88 and adder 86, as shown in FIG. 3. The INS errors are thereby continuously reduced and maintained at significantly smaller magnitudes than might be obtained without filtering.

The AINS embodiment shown in FIG. 4 provides a high dynamic body-to-navigator frame transformation of the specific force vector. The vertical component of the AINS position solution is then output to the screed controller 124, as shown in FIG. 4.

Figure 5:
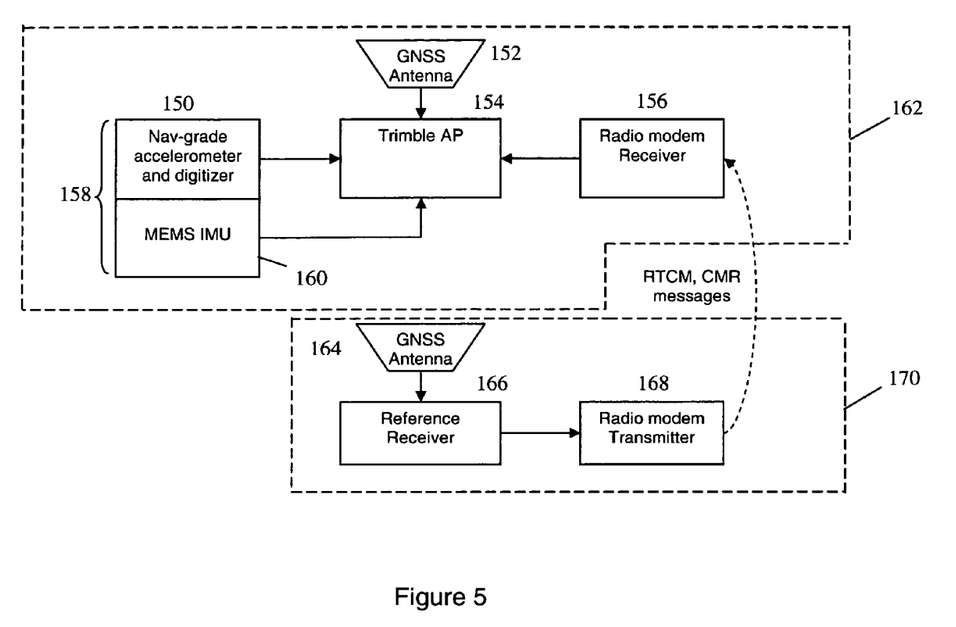
FIG. 5 shows a hardware diagram illustrating the general architecture of a vertical positioning system that operates in accordance with one embodiment of the present disclosure.

The above-described system and method may be generally incorporated into a combination GNSS-IMU control system as shown in FIG. 5. IMU 158 is a single, rigid assembly containing MEMS IMU 160 such as the Intersense Navchip and navigation grade accelerometer 150 such as the Honeywell QA2000 that is aligned with the z-axis of MEMS IMU 160. High-accuracy accelerometer 150 typically requires a digitizer to convert its analog output to digital samples of incremental velocity synchronized to the inertial sampling times of the MEMS.

The Trimble AP 154 contains a survey-grade GNSS receiver (e.g., Trimble BD960) and a MicroCore computer/processor board that implements inertial navigator 122, Kalman filter 134 and error controller 128 shown in FIG. 4. Trimble AP 154 includes GNSS antenna 152 and cable. The MicroCore processor board includes a serial interface to radio modem 156, which is the source of RTCM or CMR differential/RTK data records from reference receiver 166.[1] Radio modem receiver 156 is connected to the MicroCore processor board.

[1] RTCM stands for Radio Technical Commission for Maritime Services. In the early days of Differential GPS, RTCM set up a standard format for sending differential correction data to a GPS receiver. CMR, or Compact Measurement Record, was developed by Trimble and refers to a more bandwidth efficient protocol for Differential GPS as compared to RTCM. RTK stands for Real Time Kinematic, and uses one or more reference receiver stations to create a data correction suite that is transmitted to rover GNSS receivers to provide a high-accuracy position fix relative to one of the reference stations, or to a virtual reference station.

Reference receiver station 170 comprises reference receiver 166, GNSS antenna 164 and radio modem transmitter 168. Reference receiver station, in tandem with the Trimble AP 154, implements an RTK or carrier-phased enhanced GNSS, which is well known in the art.

The antenna 164 for reference receiver 166 is located at a reference position against which the paver screed position is to be controlled. Reference receiver 166 broadcasts differential data, usually employing an industry-standard format (RTCM Types 18/19/21/22 or CMR-Plus) using radio modem transmitter 168.

Rover unit 162 mounted on the screed receives the differential data from reference receiver station 170 and computes a complete POS navigation solution having the required 1 centimeter, 2-sigma vertical position accuracy. The AINS algorithm implemented in Trimble AP 154 delays the Kalman filter to accommodate latent differential GNSS messages. The POS navigation solution latency is unaffected by this Kalman filter delay so long as the delay is 3 seconds or less. The vertical position component of the POS navigation solution is output to the screed controller. This configuration is applicable to all sizes of pavers and all dynamics that a paver might generate.

Applications for the disclosure described herein are not limited to pavers or road building equipment. The systems and methods described herein are equally applicable to other types of heavy machinery and endeavors that require a great deal of vertical precision, such as planting seeds at an exact, optimum depth, ensuring that the foundation for a building is level and located at a particular depth with a high degree of precision, etc.

Further variations and modifications will occur to those skilled in the art. The present disclosure is for illustrative purposes only and its scope is to be measured or defined only by the following claims.

What is claimed is:

1. A method for determining vertical position comprising:
   providing navigation-grade vertical acceleration information of a body in motion;
   providing satellite-based vertical position information of the body in motion;
   processing the vertical acceleration information of the body in motion to compute vertical position information;
   determining the difference between said computed vertical position information and said satellite-based vertical position information; and
   employing said difference in processing the vertical acceleration information of the body in motion.

2. The method of claim 1, wherein the vertical position information of the body in motion comprises GNSS information.

3. The method of claim 2, wherein the GNSS information comprises GPS information.

4. The method of claim 1, further comprising compensating the computed vertical position information for latent vertical position information.

5. The method of claim 4, further comprising subtracting the compensated computed vertical position information from said satellite based vertical position information and using a result of the subtraction to make the corrections during the processing of the vertical acceleration information.

6. The method of claim 1, wherein processing the vertical acceleration information of the body in motion to compute vertical position information comprises performing at least one integration on the vertical acceleration information.

7. The method of claim 6, wherein performing the at least one integration on the vertical acceleration information comprises integrating the vertical acceleration information to determine vertical velocity information.

8. The method of claim 7, wherein performing the at least one integration on the vertical acceleration information further comprises integrating the vertical velocity information to determine the computed vertical position information.

9. The method of claim 1, wherein the vertical acceleration information comprises at least one of inertial guidance information and odometry information.

10. The method of claim 9, wherein the at least one of inertial guidance information and odometry information comprises information from an accelerometer triad and 2-axis tilt sensor.

11. A system for determining vertical position comprising:
    a navigation-grade accelerometer for determining vertical acceleration information of a body in motion;
    a processor for determining vertical position information from said vertical acceleration information;
    a satellite navigation receiver for providing reference vertical position information of said body in motion, said receiver including an antenna connected to the satellite navigation receiver configured to randomize multi-path noise; and
    a negative feedback loop, including a filter, whose input is the difference between the reference vertical position information and the determined vertical position information, and whose output is to said processor for determining corrected vertical position information.

12. A method for determining vertical position plus or minus 1 centimeter, 2-sigma, comprising:
    determining a vertical reference position using a satellite navigation receiver;
    performing a first integration of the output of a navigation-grade accelerometer with respect to time;
    using said output of the first integration as the input to a second integration with respect to time to obtain inertial vertical position;
    delaying said inertial navigation position to account for the latency associated with said global navigation system receiver;
    subtracting the delayed inertial position from said vertical reference position; and
    feeding back said difference, using negative feedback, to the acceleration and velocity integrators so as to reduce the errors introduced in the acceleration and velocity integrators from said accelerometer.

13. The method of claim 12 wherein said difference between the delayed inertial position and the vertical reference position is multiplied by a first constant and subtracting from the input of said second integration.

14. The method of claim 12 wherein said difference between the delayed inertial position and the vertical reference position is multiplied by a second constant.

* * * * *